United States Patent [19]

Redl

[11] Patent Number: 5,734,562
[45] Date of Patent: Mar. 31, 1998

[54] POWER FACTOR CORRECTION CIRCUIT

[76] Inventor: Richard Redl, ELFI S.A., Derrey-La-Cabuche, CH-1756 Onnens FR, Switzerland

[21] Appl. No.: 262,733
[22] Filed: Jun. 20, 1994
[51] Int. Cl.$^6$ ............................................. H02M 3/335
[52] U.S. Cl. ........................... 363/16; 323/222; 323/259
[58] Field of Search .................... 363/16, 20, 21; 323/222, 259, 344

[56] References Cited

U.S. PATENT DOCUMENTS

| | | | |
|---|---|---|---|
| 5,404,092 | 4/1995 | Gegner | 323/207 |
| 5,434,767 | 7/1995 | Batarseh et al. | 363/16 |

OTHER PUBLICATIONS

Michael Madigan, Robert Erickson and Esam Ismail, Integrated High Quality Rectifier-Regulators, Mar. 1992, 1992 IEEE.

Milan M. Jovanovic, Dan M.C. Tsang and Fred C. Lee, Reduction of Voltage Stress in Integrated High-Quality Rectifier-Regulators by Variable-Frequency Control, Feb. 1994, 1994, IEEE.

Pre-Publication—Richard Redl, Laszlo Balogh and Nathan O. Sokal, A New Family of Single-Stage Isolated Power-Factor Correctors with Fast Regulation of the Output Voltage, (no date).

*Primary Examiner*—Peter S. Wong
*Assistant Examiner*—Y. J. Han

[57] ABSTRACT

A power-factor-corrected switching power supply includes a power-factor-corrector cell followed by a current-fed dc/dc converter cell. Both cells operate in discontinuous current mode. A duty cycle modulator has its input coupled to the output of the current-fed dc/dc converter cell and its output coupled to the switch control inputs of both the PFC cell and the current-fed dc/dc converter cell so that both cells receive the same control signal.

7 Claims, 7 Drawing Sheets

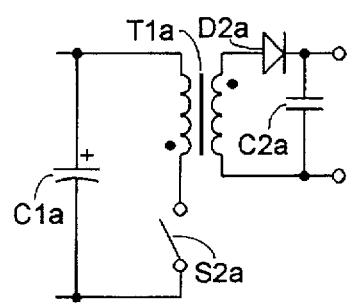
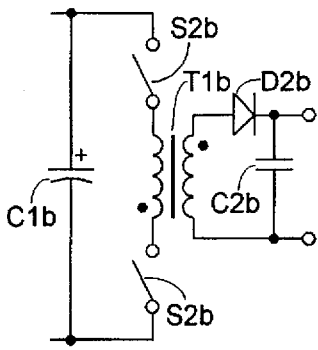
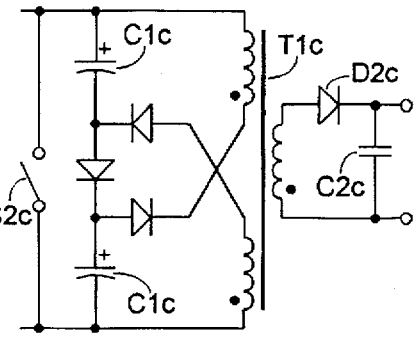
FIG. 3(a)  FIG. 3(b)  FIG. 3(c)
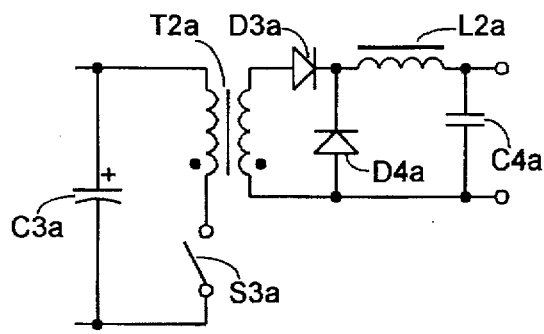
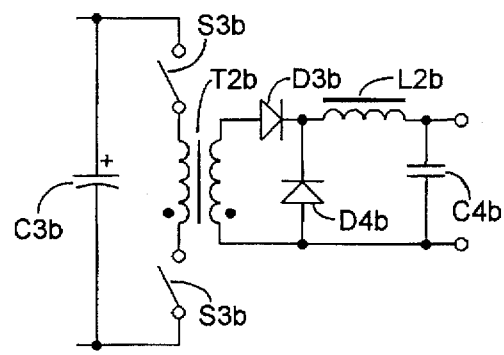
FIG. 4(a)  FIG. 4(b)
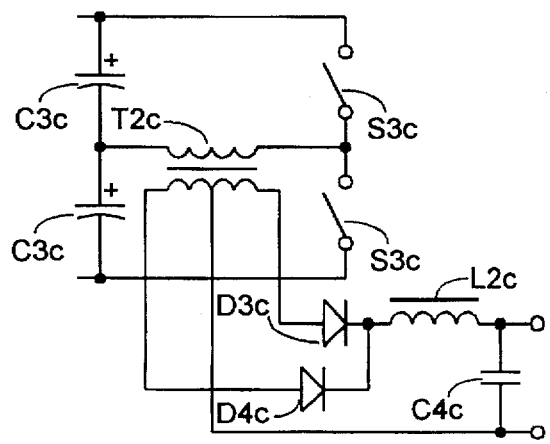
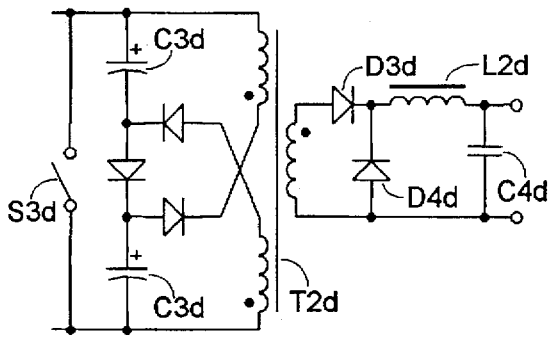
FIG. 4(c)  FIG. 4(d)

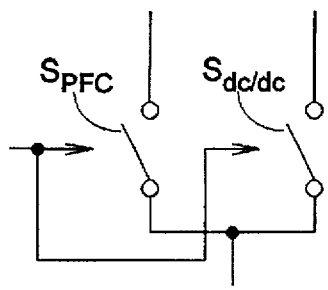
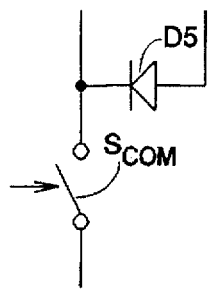
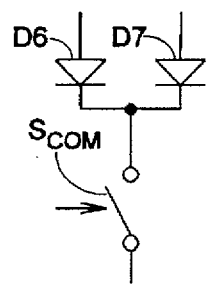
FIG. 5(a)  FIG. 5(b)  FIG. 5(c)
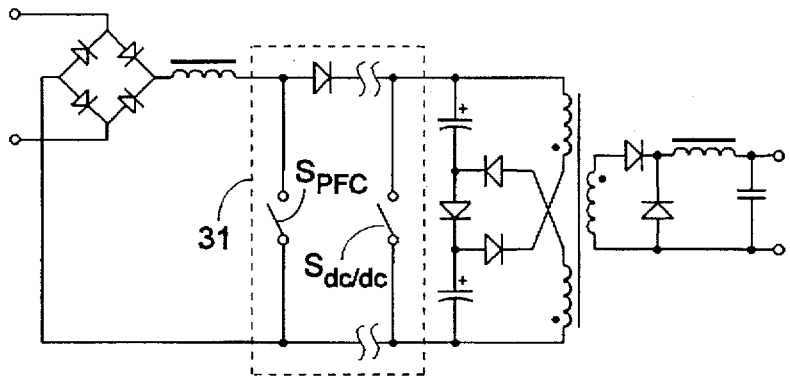
FIG. 6(a)
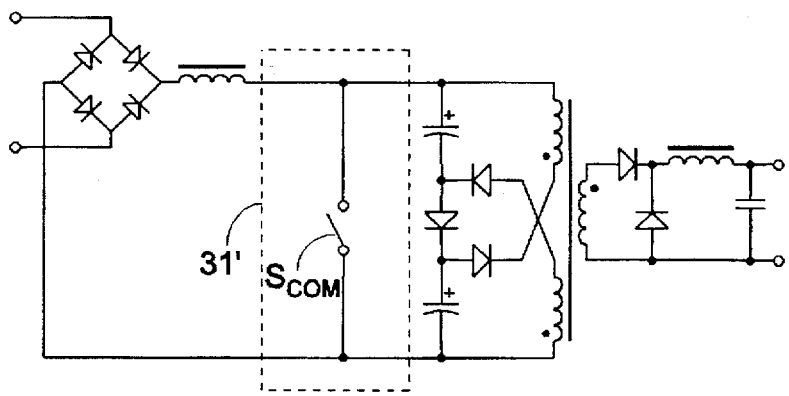
FIG. 6(b)
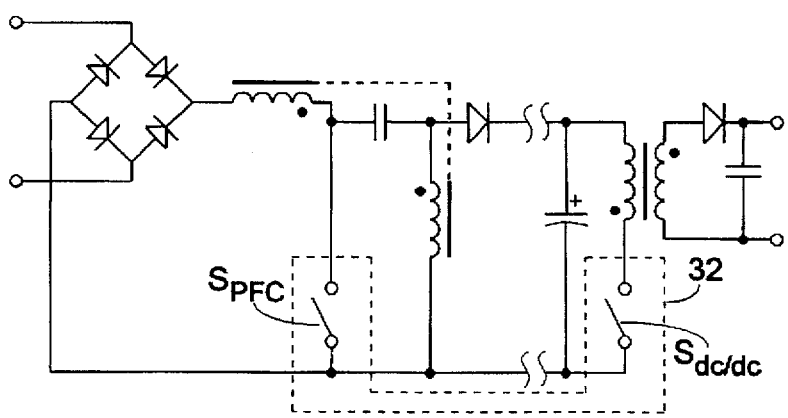
FIG. 7(a)

5,734,562

1

POWER FACTOR CORRECTION CIRCUIT

FIELD OF THE INVENTION

The present invention relates in general to power factor correcting and more particularly concerns single-stage isolated power-factor correcting with fast regulation of the output voltage.

BACKGROUND OF THE INVENTION

A number of standards require that the harmonics of the line current of an electronic equipment stay below certain specified levels. A typical prior art approach for meeting the requirements is to add a power-factor corrector ahead of the isolated dc/dc converter section of the switching power supply. Adding this power-factor corrector typically increases the size and cost of the power supply. A prior art approach to keeping size and cost increase within acceptable limits is to integrate the functions of power-factor correction and isolated dc/dc conversion into a single power stage. These typical prior art approaches are characterized by one or more of the following disadvantages:
1) a large low-frequency ripple at the output;
2) slow regulation of the output voltage;
3) complexity of the circuit topology;
4) complexity of circuit operation;
5) complexity of the control;
6) large increase of the voltage across the storage capacitor at light load;
7) large energy stored in the leakage inductance;
8) low exploitation of the power transformer due to transmission of pulsating power;
9) low efficiency, due to $i^2R$ losses associated with large circulating current.

SUMMARY OF THE INVENTION

It is an important object of this invention to provide improved single-stage isolated power-factor correctors with fast regulation of the output voltage.

According to the invention, there is a power factor cell constructed and arranged to operate in the discontinuous current mode that current feeds a dc/dc conversion cell also constructed and arranged to operate preferably in the discontinuous current mode. Each cell has a switch control input driven by a duty cycle modulator having its input coupled to the output of the current-fed dc/dc converter cell that is constructed and arranged to coact with the power factor correction cell and current-fed dc/dc converter cell to cause said cells to operate in the discontinuous current mode and maintain the output voltage of the dc/dc converter cell substantially constant.

According to a specific aspect of the invention, the power factor correction cell and current-fed dc/dc converter cell share a common switch.

Other features, objects and advantages of the invention will become apparent from the following detailed description when read in connection with the accompanying drawings.

BRIEF DESCRIPTION OF THE DRAWING

FIGS. 3a, 3b and 3c are schematic circuit diagrams of current-fed isolated dc/dc converter cells based on the buck-boost converter with single-switch flyback, two-switch flyback and series/parallel flyback, respectively;

FIGS. 4a, 4b, 4c and 4d are schematic circuit diagrams of current-fed isolated dc/dc converter cells based on the buck converter with single-switch forward, two-switch forward, half-bridge and series/parallel forward, respectively;

FIG. 5a is a schematic showing two switches with unison control and common reference point;

FIG. 5b is a schematic of a combination when left switch always has a higher off voltage;

FIG. 5c is a schematic of a combination when the off voltage of the left switch can be lower or higher than that of the right switch;

FIGS. 6a and 6b are schematic circuit diagrams showing how the circuitry in the dashed box of FIG. 6a may be combined into a single switch in the dashed box of FIG. 6b;

FIGS. 7a and 7b show how the circuitry in the dashed box of FIG. 6a may be combined to form the circuitry in the dashed box of FIG. 6b for a SEPIC PFC cell;

DESCRIPTION OF THE PREFERRED EMBODIMENTS

Figure 1:
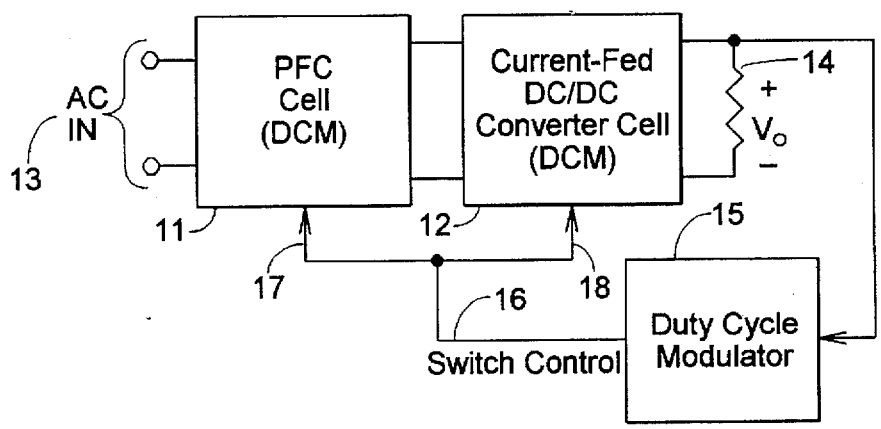
FIG. 1 is a block diagram illustrating the logical arrangement of a system according to the invention.

With reference now to the drawings and more particularly FIG. 1, there is shown the logical arrangement of a system according to the invention. The power-factor-corrected switching power supply comprises a power-factor-corrector cell (PFC) 11 followed by a current-fed dc/dc converter cell 12, typically isolated. AC power applied to input terminals 13 is converted into a dc voltage $V_o$ across load 14 at the output of converter cell 12. The duty cycle modulator 15 monitors the dc output voltage $V_o$ and provides a switch control signal on switch control line 16 that is common to the switch control inputs 17 and 18 of PFC cell 11 and converter cell 12. The circuitry is constructed and arranged so that both cells operate in the discontinuous current mode for a substantial portion of the full range of output current while maintaining the output voltage $V_o$ substantially constant in the presence of variations in load current. In the discontinuous current mode, the current in the free-wheeling diode associated with the PFC cell and the current in the output diode (or output diodes in case of more than one output diode) of the converter cell assumes a value of substantially zero for a finite time interval in each cycle before the switches in the PFC cell and the converter cell (or the only switch if the switches of the PFC cell and the converter cell are combined into a single switch) are turned on again.

Discontinuous current mode of dc/dc converters is discussed extensively in the technical literature, for example on pages 12–18 and 51–54 of the book "Modern dc-to-dc switchmode power converter circuits" by R. P. Severns and G. E. Bloom (Van Nostrand Reinhold, 1985). Discontinuous current mode of the boost PFC cell is discussed in the paper "Current waveform distortion in power factor correction circuits employing discontinuous-mode boost converter," by K-H Liu and Y-L Lin (Proceedings of the 20th Annual IEEE Power Electronics Specialists Conference, pp. 825–829, 1989).

Referring to FIG. 2, there are shown schematic circuit diagrams of some practical PFC cells. FIGS. 2a, 2b, 2c, 2d 2e and 2f show the boost, SEPIC, buck-boost, Cuk, buck and two-switch buck-boost cells, respectively.

Referring to FIG. 3, there are shown some practical isolated current-fed dc/dc converter cells based on the buck-boost converter. FIGS. 3a, 3b and 3c show single-switch flyback, two-switch flyback and series/parallel flyback converter cells, respectively.

Referring to FIG. 4, there are shown some practical isolated current-fed dc/dc converter cells based on the buck converter. FIGS. 4a, 4b, 4c and 4d show single-switch forward, two-switch forward, half-bridge and series/parallel forward converter cells, respectively.

All figures use the following conventions: flyback transformers (i.e. transformers with intentional energy storage) and inductors are drawn with a thick line representing the core; transformers for buck-derived converters (i.e. transformers without intentional energy storage) are drawn with a thin line representing the core; capacitors with significant low-frequency energy storage capacity are drawn with polarity indication and capacitors with negligible low-frequency energy-storage capacity are drawn without polarity indication. Also for clarity, the figures do not show the reset and clamp circuits of the single-switch and two-switch flyback and forward converter cells.

Each PFC cell is free of a low-frequency energy-storage capacitor and includes a full-wave rectifying bridge 21a–21f, respectively, an energy storage inductor $L_1a$–$L_1f$, respectively, one or two controlled switches S1a–S1g, respectively, and one or two diodes D1a–D1g, respectively.

Figure 2A:
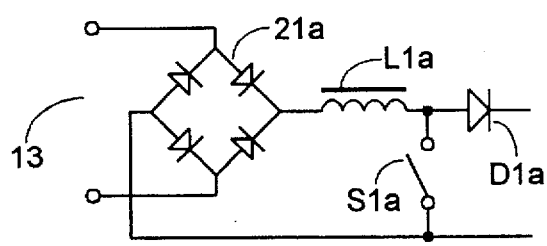
FIGS. 2a, 2b, 2c, 2d, 2e, and 2f are schematic circuit diagrams of boost, SEPIC, buck-boost, Cuk, buck, and two-switch buck-boost PFC cells, respectively.
Figure 2B:
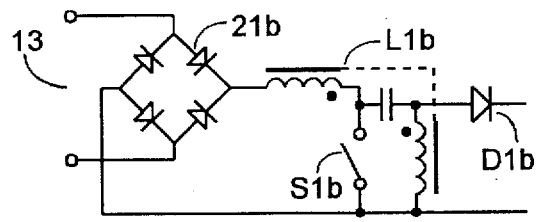
Figure 2C:
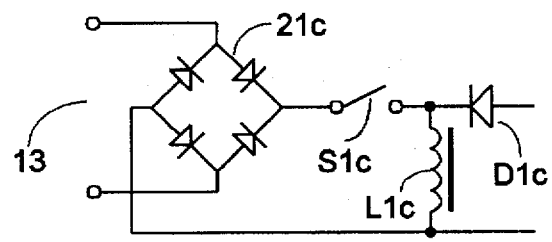
Figure 2D:
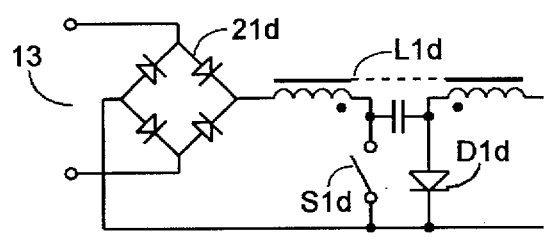

FIGS. 2b and 2d show inductor L1b and L1d as coupled-inductor versions of the SEPIC and Cuk converters. These PFC cells may also be in a form with two independent inductors, and the PFC may also comprise tapped inductors or two-transformer forms of series/parallel cells.

Each current-fed isolated dc/dc converter cell based on the buck-boost converter shown in FIG. 3 includes a low-frequency energy-storage capacitor C1a–C1c, respectively, a transformer T1a–T1c, respectively, an output diode D2a–D2c, respectively, and an output capacitor C2a–C2c and an output switch S2a–S2c, respectively. The two-switch flyback circuit of FIG. 3b has two switches in series with the primary of transformer T1b. The series/parallel flyback circuit of FIG. 3c has two low-frequency energy-storage capacitors connected in series by a diode as shown with transformer T1c having two primary windings coupled to a respective energy-storage capacitor by a diode as shown and relatively polarized as indicated by the dots by the winding ends.

Each current-fed isolated dc/dc converter cell based on the buck converter shown in FIGS. 4a–4d has a low-frequency energy-storage capacitor C3a–C3d, respectively, a transformer T3a–T3d, respectively, a pair of output diodes D3a–D3d, respectively, and D4a–D4d, respectively, an output inductor L2a–L2d, respectively, an output capacitor C4a–C4d, respectively, and an output switch S3a–S3d, respectively. The circuit of FIG. 4b has two controlled output switches in series with the primary of transformer T2b. The circuit of FIG.4c has two energy-storage capacitors with the primary of transformer of T2c connected between the junction of these capacitors and the junction of the two output switches that are in series. In a common variation of the circuit of FIG. 4c (not shown here) a single energy-storage capacitor is used instead of the two serially connected capacitors. In that variation the required ac coupling of the primary winding of the transformer is achieved by using one or two coupling capacitors connected between one end of the primary winding of the transformer and the negative and/or positive terminals of the single energy-storage capacitor. The capacitance of a coupling capacitor is much smaller than the value of an energy-storage capacitor. In another common variation of the circuit of FIG. 4c (also not shown here) a single energy-storage capacitor is used together with a full-bridge version of the dc/dc converter shown in FIG. 4c. In the full-bridge dc/dc converter using a coupling capacitor in series with the primary winding of the transformer is optional.

While the two switches of the circuits of FIGS. 3b and 4b are usually controlled in unison, the two switches of the circuit of FIG. 4c and its two-switch variation with coupling capacitor(s), or the two diagonally opposite pairs of switches in its full-bridge variation, are usually controlled in an interleaved or "push-pull" fashion. In the interleaved, or "push-pull" control, the two switches (or diagonally opposite pairs of switches) are conducting for equal lengths of time, but the conduction times are shifted such that simultaneous conduction of any two switches connected in series is avoided.

The circuit of FIG. 4d has two energy-storage capacitors intercoupled by a diode as shown, and transformer T2d has two primary windings connected to the energy storage capacitors by respective diodes poled as shown. In several combinations of the PFC and dc/dc converter cells, the switch in the PFC cell is referenced to the same point as one of the switches in the dc/dc converter cell. It is possible to combine those switches of the PFC and dc/dc converter cells that are controlled in unison into a single switch, using one or two diodes, if necessary, as shown in FIGS. 5a, 5b and 5c. Thus, switch $S_{PFC}$ in a PFC cell may be combined with a switch $S_{dc/dc}$ in a dc/dc converter cell referenced to the same point by a single switch $S_{COM}$ and a diode D5 poled as shown when the left switch $S_{PFC}$ in FIG. 1A has a higher off voltage and with diodes D6 and D7 poled as shown when the off voltage of the left switch $S_{PFC}$ in FIG. 5a may be lower or higher than that of the right switch $S_{dc/dc}$. When the off voltages of the two switches to be combined are equal, there is no need to use additional diodes.

FIG. 6b shows how to combine the switch of a boost PFC cell with the switch of the series/parallel forward converter cell by combining the boost switch $S_{PFC}$, the boost diode D1 and switch $S_{dc/dc}$ of the series/parallel forward converter cell inside the dashed box 31 into the single switch $S_{COM}$ in the dashed box 31' in FIG. 6B.

Figure 7B:
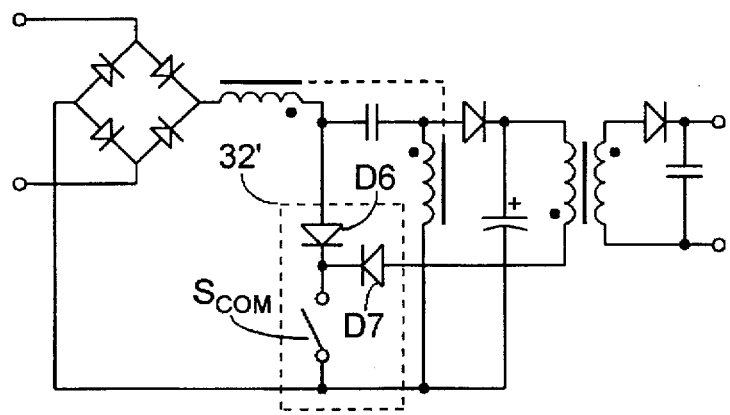
Figure 8A:
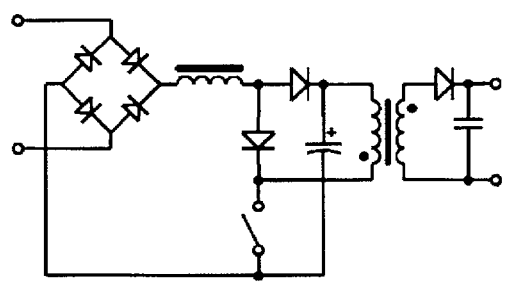
FIGS. 8a, 8b, 8c, 8d, 8e and 8f are schematic circuit diagrams of single-stage isolated power-factor-corrected power supplies according to the invention based on the boost PFC cell.
Figure 8B:
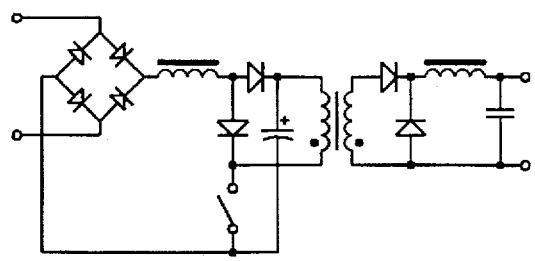
Figure 8C:
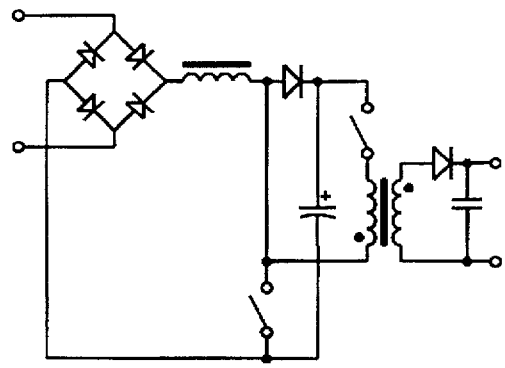
Figure 8D:
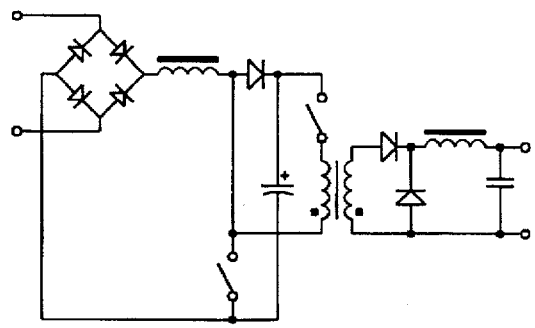
Figure 8E:
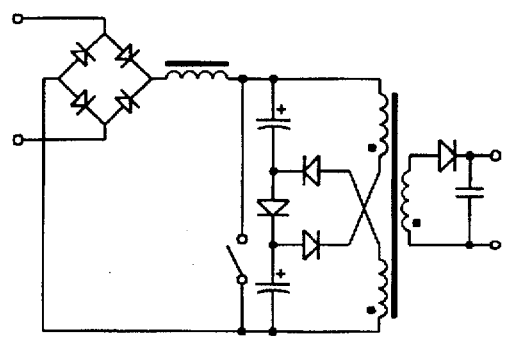
Figure 8F:
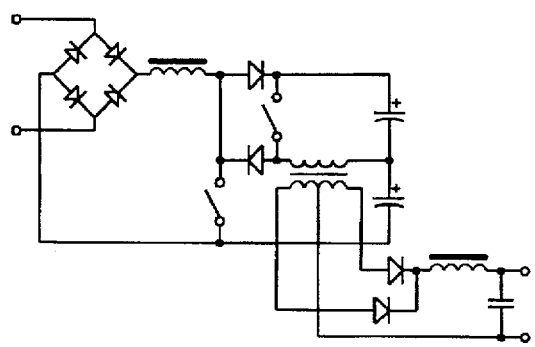

FIG. 7b shows the case when the SEPIC PFC cell, such as in FIG. 2b is combined with a single switch flyback dc/dc converter cell, such as in FIG. 3b by combining the two ground-referenced switches $S_{PFC}$ and $S_{dc/dc}$ in the dashed box 32 of FIG. 7a to form the single switch $S_{COM}$ with diodes D6 and D7 in dashed box 32'. The reason for using diodes D6 and D7 is that close to the zero-crossing of the AC-line voltage, the off voltage of the SEPIC switch is smaller than that of the flyback switch; but close to the peak of the line the SEPIC switch is likely to have a higher off voltage than the flyback switch.

FIGS. 8a–8f show schematic circuit diagrams of practical combinations of single-stage isolated power-factor-corrected power supply topologies according to the invention using the boost PFC cell, such as shown in FIG. 2a.

Figure 2E:
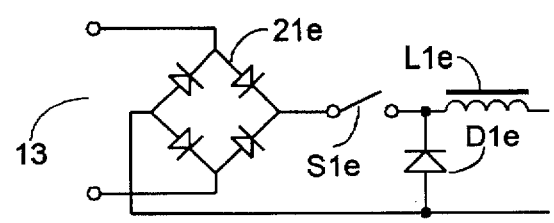
Figure 2F:
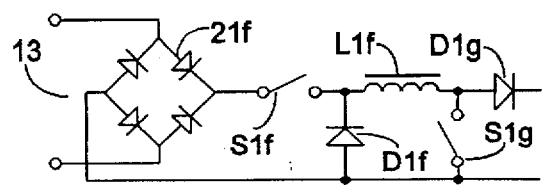

The average current (averaged over a switching cycle) of all PFC and dc/dc converter cell combinations is continuous, except for the combinations of the buck PFC cell, such as shown in FIG. 2e, and those dc/dc converter cells where there is a storage capacitor (or two storage capacitors in series) directly in parallel with the input terminals of the dc/dc cell, such as those shown in FIGS. 3a, 3b, 4a, 4b and 4c. In those configurations, no current can flow in the AC line when the instantaneous line voltage is below the voltage across the storage capacitors.

Figure 9A:
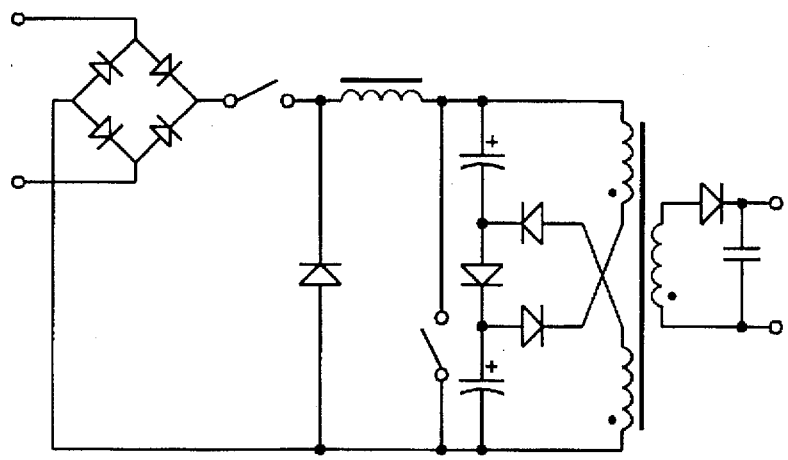
FIGS. 9a and 9b are schematic circuit diagrams involving combining a buck PFC and a series/parallel flyback or forward converter cell, respectively.
Figure 9B:
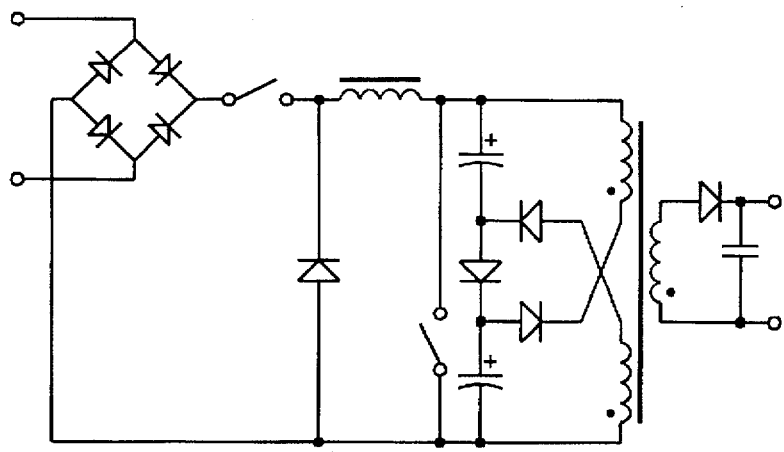

Referring to FIG. 9, there are shown schematic circuit diagrams of topologies combining a buck PFC and a series/parallel flyback and forward converter cells, respectively. These circuits have continuous (average) current down to zero instantaneous line voltage. "Continuous average current" means that the average current, averaged over a switching cycle, is different from zero. Having described specific circuit topologies, it is appropriate to consider the mode of operation. Both the PFC section and the dc/dc converter section operate in discontinuous conduction mode (DCM) for substantially the full current range. Where a section contains only one inductive energy-storage component, DCM means that by the end of the switching cycle, the inductor delivers all of its stored energy to the next stage or to the load. Specific examples described above, including the coupled-inductors SEPIC example, such as shown in FIG. 2b and Cuk, such as shown in FIG. 2d, PFC cells, have only one inductive energy-storage component per section. In circuit topologies where a section contains two inductive energy-storage components, for example, the uncoupled-inductor versions of the SEPIC or Cuk cells, not shown herein, DCM means that the free-wheeling diode of the cell, such as diodes D1b and D1d, stops conducting at some point within the switching cycle. Conduction stops when the currents in the two inductors of the cell become equal.

A single fast control loop comprising duty cycle modulator 15 (FIG. 1) controls switching to keep the output voltage $V_o$ substantially constant by monitoring it and altering the ratio of switch-closed to switch-opened time, typically with a form of pulse-with modulation. In accordance with known switching regulator techniques, the pulse-width modulation may be based on voltage-mode control or one of the several types of current-mode control, either constant-frequency or variable-frequency. If current-mode control is used, the inner current-controlling loop is preferably responsive to the current flowing in the dc/dc converter section because the current in the PFC section fluctuates with the instantaneous AC-line voltage. It is then not acceptable to monitor only the current of the switch that carries the currents of both sections. A signal corresponding to the current in the output section can be provided by a current transformer in series with the primary winding of the power transformer or by sensing both the total switch current and the current in the PFC section and subtracting the PFC current signal from the switch current signal.

It is still within the principles of the invention if the dc/dc converter section slips into CCM (continuous current mode) at, or close to, full load, but for reduced variation of the storage-capacitor voltage, it is desirable that it does not move into deep CCM. DCM of both sections for substantially the full range of load current establishes an inherent energy balance at varying load, and the voltage across the storage capacitor is independent of the load current.

Figure 10:
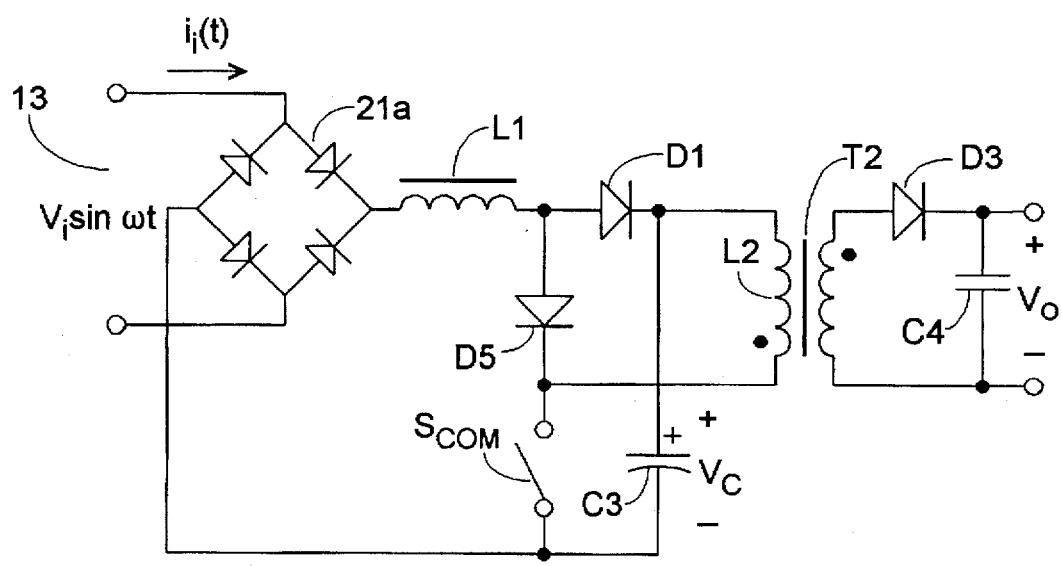
FIG. 10 is a schematic circuit diagram of boost/single-switch flyback combination circuit.

For steady-state analysis of the invention, it is convenient to refer to FIG. 10 which shows the boost PFC circuit, such as that of FIG. 2a, with a single-switch flyback dc/dc converter, such as that of FIG. 4a. An important quantity is the voltage $V_c$ across storage capacitor C3. That voltage can be determined by equating the energy absorbed from the AC line during a line half-cycle with the energy delivered to the load during the same half cycle. The energy equality can be written as follows:

$$\int_0^{T/2} v_i(t)i_i(t)dt = \frac{T}{2} V_o I_o \tag{1}$$

where T is the line period and $V_o$ and $I_o$ are the output DC voltage and current. Substituting the circuit parameters and the time function of the line voltage yields the following equation for the voltage $V_c$:

$$\frac{2}{T} \frac{V_i^2}{V_c} \frac{L_2}{L_1} \int_0^{T/2} \frac{\sin\omega t}{V_c - V_i \sin\omega t} dt = 1 \tag{2}$$

Where $L_1$ is the inductance of the boost inductor and $L_2$ is the inductance of the primary winding of the flyback transformer D2.

Figure 11:
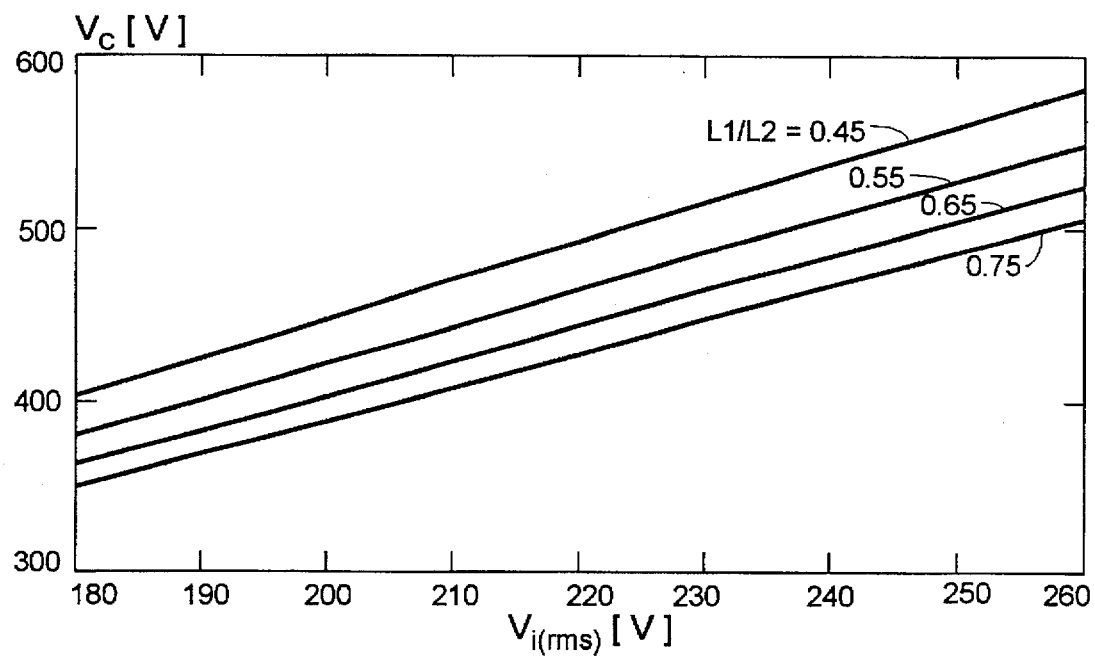
FIG. 11 is a graphical representation of the voltage across the storage capacitor as a function of the rms line voltage for different ratios of boost and flyback inductances.

Equation (2) does not have a closed-form solution; however, it may be solved numerically. FIG. 11 shows the voltage $V_c$ as a function of the RMS line voltage with $L_1/L_2$ as the parameter. This plot shows that the voltage across the storage capacitor increases with increasing line voltage and with decreasing ratio of the boost and flyback inductances. When this inductance ratio is 0.55, the voltage stays between 380 and 550 V over a line voltage range of 180 to 260 $V_{RMS}$ and is independent of load current.

Figure 12:
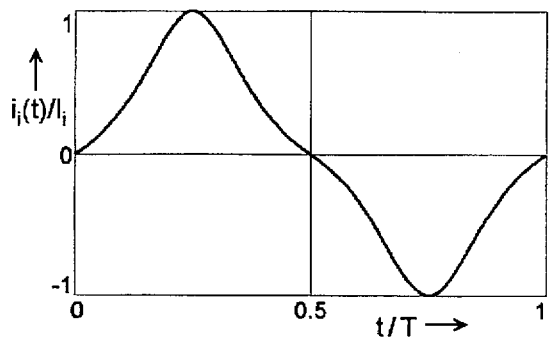
FIG. 12 is a graphical representation of a period of the calculated averaged line-current waveform when the ratio $L_1/L_2$ of the boost and flyback inductances is 0.55.

Referring to FIG. 12, there is shown a period of the calculated averaged line/current waveform for $L_1/L_2 = 0.55$. (The line current is averaged by a high-frequency EMI filter not shown in the schematic of FIG. 10). FIG. 12 shows a discernible distortion in the current waveform. In general, this distortion is a function of the ratio of the storage-capacitor voltage and the line voltage. The larger the voltage ratio, the smaller the distortion. Because the voltage ratio is a function of the inductance ratio, the distortion itself also becomes a function of the inductance ratio. This property allows achieving low distortion with increased voltage $V_c$, and vice versa.

The line-current harmonics and the total harmonic distortion can be determined using numerical Fourier transform. With an inductance ratio of 0.55, the calculated total harmonic distortion is about 20.9%, and the ratio of the third harmonic to the fundamental of the line current is 20.8%, indicating that most of the distortion is third-harmonic distortion.

Like distortion, the power factor depends only on the ratio of $L_1$ and $L_2$. Table 1 shows power factor as a function of the inductance ratio.

TABLE 1

POWER FACTOR AS A FUNCTION OF THE INDUCTANCE RATIO $L_1/L_2$

| $L_1/L_2$ | 0.45 | 0.55 | 0.65 | 0.75 |
|---|---|---|---|---|
| PF [%] | 98.3 | 97.9 | 97.5 | 97 |

The RMS current is given by:

$$I_{rw(rms)} = \sqrt{\frac{D^3 T_s^2}{3} \left( \frac{V_l^2}{2L_2^2} + \frac{V_c^2}{2L_2^2} + \frac{4V_l V_c}{\pi L_1 L_2} \right)} \quad (3)$$

where D is a switch conduction duty ratio and $T_s$ is the switching period. The duty ratio can be determined from the storage-capacitor voltage, the inductance of the primary winding of the flyback transformer, the output power P, and the switching period. Its value is:

$$D = \frac{1}{V_c} \sqrt{\frac{2L_2 P}{T_s}} \quad (4)$$

Substituting the expression for D into equation (3) yields the switch RMS current as a function of the storage-capacitor voltage and the output power. The value of the switch RMS current can then be obtained by inserting values of the AC-line voltage and the corresponding storage capacitor voltage from the plot of FIG. 11. Similar analysis can be conducted for other embodiments of the invention. Embodiments that incorporate the buck-boost, SEPIC, Cuk or two-switch buck-boost PFC cell, and also the combination of the buck PFC cell and the series/parallel flyback or forward dc/dc converter cell, theoretically produce zero distortion of the filtered AC-line current type.

The small-signal AC analysis of embodiments of the invention can be practiced by considering the two sections (PFC and dc/dc) of the circuit as the cascade connection of two converters, such as by using the method of characteristic coefficients discussed in the publication co-authored by applicant entitled "Dynamic Analysis of Switching-Mode DC/DC Converters," Van Nostrand Reinhold, 1991 (ISBN 0-442-23916-5). In most practical applications, the large energy-storage capacitor essentially decouples the two sections so that some of the transfer functions of the PFC section and dc/dc converter section can be analyzed without considering the influence of the other section. Because of the instantaneous power balance that inherently exists in the system, the transfer function of control voltage to storage-capacitor voltage is zero, meaning that a change in the control voltage will not change the storage-capacitor voltage. (The power balance is instantaneous on the time scale of the AC-line half-cycle, but not on the time scale of the switching cycle.) The following properties are helpful in designing circuits according to the invention. The line-current distortion of the circuits with boost PFC section depends on the ratio of the voltage across the storage capacitor and the line RMS (or peak) voltage. The voltage ratio, in turn, depends on the ratio of the boost inductance and the inductance in the dc/dc converter section. The small inductance ratio yields a high voltage ratio and a filtered line current wave form that is of low distortion. Consequently, a direct trade-off exists between the distortion and the voltage across the storage capacitor.

Circuits with buck-boost, SEPIC, Cuk or two-switch buck-boost PFC cell (and also with buck PFC cell combined with series/parallel dc/dc-converter section) have theoretically zero line-current distortion, independent of the inductance ratio.

The buck PFC cell terminated with a dc/dc cell having a capacitor in parallel with its input terminals cannot draw current from the line when the instantaneous line voltage is below the storage-capacitor voltage. This condition leads to a large distortion.

Turning to EMI considerations, by coupling the two inductors of the SEPIC or Cuk PFC cells, complete ripple-current cancellation may be approached. It is advantageous to reduce the high-Q resonance between the leakage inductance and the coupling capacitance by a series RC damping circuit in parallel with the coupling capacitor.

When using current-mode control, as explained above, the current in the output section is controlled. It is still desirable to include a second current sensor that senses either the input current or the total switch current to provide an additional input to the overload protection circuit of the switch. The second current signal is used at start-up or any surge in the line voltage.

Voltage across the storage capacitor is a proportional function of the line voltage. Typically, the storage-capacitor voltage varies over a three-to-one range when the line voltage varies between 90 and 270 Vrms. It is straightforward to design the power supply to accommodate that variation. Reduced variation in the storage-capacitor voltage may be achieved if the ratio of the inductances of the PFC and dc/dc converter sections is set according to the AC/line voltage. Satisfactory results can be achieved by reducing the PFC inductance by a factor of four for 115-$V_{rms}$ AC-line voltage operation. A way to implement this reduction is by placing two windings with equal numbers of turns on the PFC inductor and connecting the two windings in series at 230-$V_{rms}$ line and in parallel at 115-$V_{rms}$ line.

Since embodiments of the invention do not need to handle leakage inductance energy in excess of that customarily present in similar switching converters, the usual simple RCD or low-loss snubbers or clamps are adequate.

In some embodiments of the invention, such as in the circuits of FIGS. 6b, 8c, 8d, 8e, and 8f, the rectifier diodes in the bridge rectifier are turned off with the rather high di/dt that exists in the boost inductor during the decaying part of the current period. It may be desirable to place a high-frequency diode either in series with the boost inductor or in some other suitable current path.

Two actual 100-W (50-V/2-A) circuit embodiments have been built and tested and found to work satisfactorily for the intended purpose. The first circuit is a single-switch boost/flyback combination corresponding substantially to FIGS. 8a and 10. The second is a single-switch coupled-inductor SEPIC/flyback combination, such as shown in FIG. 7b. Both circuits are modifications of an existing switching power supply and were operated with an AC-line voltage of about 180 Vrms with the $L_1/L_2$ inductance ratio of the boost/ flyback circuit of 0.6. The inductance ratio of the SEPIC/ flyback circuit is unity. Both circuits are controlled with a UC3843 IC, using peak-current control in the flyback section with a switching frequency of 100 kHz.

Figure 13:
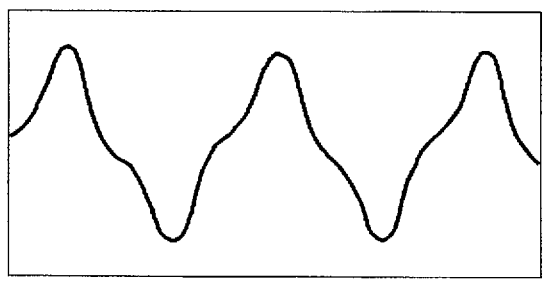
FIG. 13 is the waveform of the filtered line current of a 100 Watt boost/flyback experimental circuit corresponding to the boost/flyback combination circuit shown in FIGS. 8a and 10.

FIG. 13 shows the filtered line current waveform of the boost/flyback circuit at full load. This measured waveform is very close to the calculated waveform shown in FIG. 12.

Figure 14:
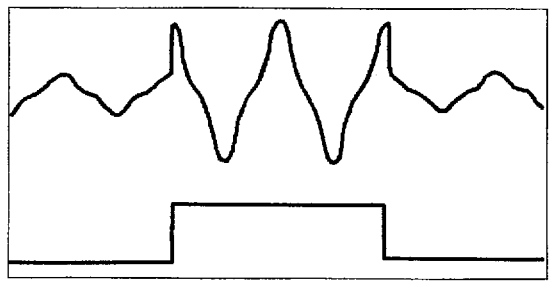
FIG. 14 shows the transient response of the line current of the boost/flyback circuit to a step change in the load from 25% to 100% and back.

FIG. 14 shows the transient response of the line current (top trace) of the same current to a step change in the load current from 25% to 100% and back. The bottom trace is the control signal for the load switch. This waveform shows that the line current resumes the required new value without appreciable delay.

Figure 15:
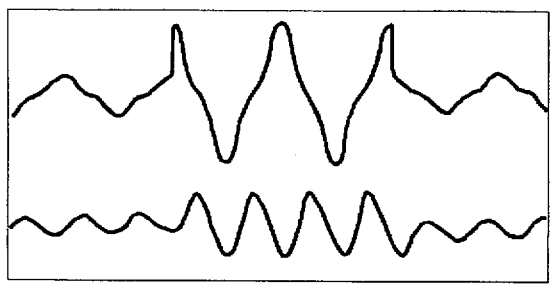
FIG. 15 is the transient response of the line current (top trace) and storage capacitor voltage (bottom trace) of the boost/flyback circuit to a step change in the load from 25% to 100% and back shown in the bottom trace of FIG. 14.

FIG. 15 shows the line current (top trace) and the voltage across the storage capacitor (bottom trace) when the load changes from 25% to 100% and back. The only observed effect of the increased load on the voltage of the storage capacitor is an increase in the ripple voltage.

Figure 16:
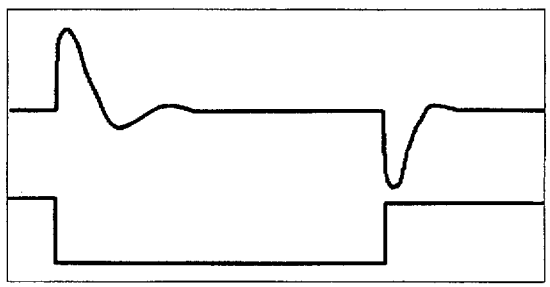
FIG. 16 is the transient response of the output voltage (top trace) of the boost/flyback circuit to a step change in the load from 100% to 25% and back.

FIG. 16 shows the response of the output voltage (top trace) of the circuit to the step change in the load current from 100% to 25% and back. The bottom traces the control signal for the load switch. The response is very fast because it is determined solely by the dc/dc converter section with its wide-band voltage-regulating loop.

Figure 17:
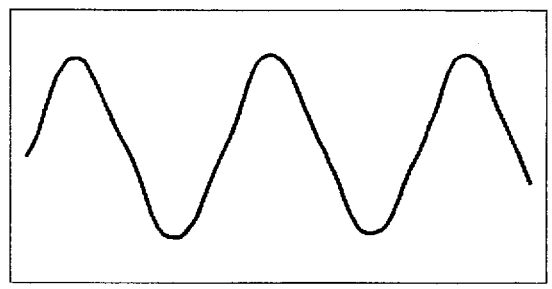
FIG. 17 is the waveform of the filtered line current of the 100-W (50-V/2-a) SEPIC/flyback experimental circuit.

FIG. 17 shows the filtered line current of the SEPIC/ flyback circuit. This waveform is a nearly ideal sinusoid with very little distortion.

Figure 18:
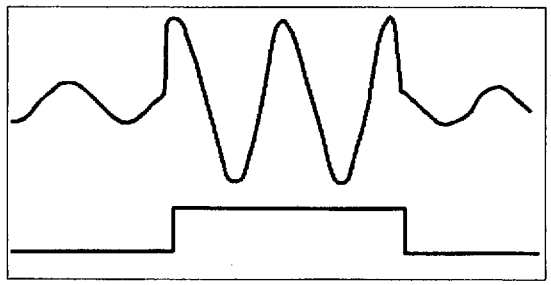
FIG. 18 is the transient response of the line current of the SEPIC/flyback circuit (top trace) to a step change in the load from 25% to 100% and back (bottom trace)

FIG. 18 shows the transient response of the line current (top trace) of the SEPIC/flyback circuit to a step change in the load current from 25% to 100% and back. (The bottom trace is the control signal for the load switch.) The line current resumes the new value without appreciable delay.

Figure 19:
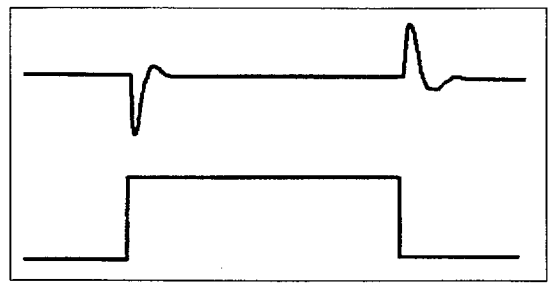
FIG. 19 is the transient response of the output voltage (top trace) of the experimental SEPIC/flyback circuit to a step change in the load from 25% to 100% and back.

FIG. 19 shows the response of the output voltage (top trace) of the SEPIC/flyback circuit to a step change in the load current from 25% to 100% and back. (The bottom trace is the control signal for the load switch.) This waveform shows that the response is very fast.

Other embodiments are within the claims. For example, the invention embraces multiple-output extensions of the dc/dc converter cells and configurations where the duty cycle modulator regulates a quantity other than the output voltage (e.g., output current or power).

What is claimed:

1. A power-factor-corrected switching power supply that operates over a range of output currents, comprising:

a power-factor-corrected cell having an alternating-current input, a switch-control input, and a direct-current output, a direct-current-to-direct-current converter cell having a direct-current input coupled to said direct-current output of said power-factor-corrected cell, a switch-control input, and a direct current output, and a duty-cycle modulator having an input coupled to said direct-current output of said direct-current-to-direct-current converter cell and an output coupled to both said switch control input of said power-factor-corrected cell and to said switch-control input of said direct-current-to-direct-current converter cell, characterized in that both said power-factor-corrected cell and said direct-current-to-direct-current converter cell are constructed and arranged to operate in a discontinuous current mode for substantially said range of output currents of said power-factor-corrected switching supply.

2. A power-factor-corrected switching power supply that operates over a range of output currents, comprising, a power-factor corrector cell having a pair of alternating-current input terminals to be coupled to the alternating-current utility mains, at least one switch control input, and a pair of output terminals, said cell being arranged to provide unipolar current pulses at said pair of output terminals, a current-fed direct-current-to-direct-current converter cell having a pair of input terminals coupled to the output terminals of said power-factor corrector cell, at least one switch control input, and a pair of direct-current output terminals, and, a duty cycle modulator having an input coupled to the direct-current output terminals of said current-fed direct-current-to-direct-current converter cell and at least one output coupled to the switch control inputs of said power-factor corrector cell and the current-fed direct-current-to-direct-current converter cell, both said power-factor corrector cell and said current-fed direct-current-to-direct-current converter cell constructed and arranged to operate in a discontinuous current mode for substantially said range of output currents furnished by said power-factor-corrected switching power supply.

3. A power-factor-corrected switching power supply in accordance with claim 2, wherein said power-factor corrector cell comprises a mains rectifier bridge connected to said alternating-current input terminals, said mains rectifier bridge having first and second bridge outputs, an inductor having a first terminal connected to said first bridge output and a second terminal, a switch connected between said second terminal and said second bridge output, and a diode having a first terminal connected to said second terminal, said diode having a second terminal connected to said current-fed direct-current-to-direct-current converter cell.

4. A power-factor-corrected switching power supply in accordance with claim 2 wherein said current-fed dc/dc converter cell comprises a storage capacitor having first and second terminals, and further including a first switch having its first terminal connected to the first terminal of said storage capacitor and having a second terminal, a flyback transformer having a primary winding with first and second terminals and a secondary winding with first and second terminals, the first terminal of said primary winding being connected to said second terminal of said first switch, a second switch having a first terminal connected to said second terminal of said primary winding and a second terminal, said second terminal of said second switch connected to said second terminal of said storage capacitor, a diode having a first terminal connected to said first terminal of said secondary winding and having a second terminal, and a filter capacitor connected between said second terminal of said diode and said second terminal of said secondary winding.

5. A power-factor-corrected switching power supply in accordance with claim 4 wherein said second switch is a short circuit.

6. A power-factor-corrected switching power supply in accordance with claim 2 wherein said switches are constructed and arranged to respond to said duty cycle modulator to provide a single switch switching action in both said power-factor corrector cell and said current-fed dc/dc converter cell.

7. A method of operating a power-factor-corrected switching power supply that operates over a range of output currents, comprising, provided a power-factor corrector cell having an alternating-current input, a switch control input, and a direct-current output, providing a direct-current-to-direct-current converter cell having a direct-current input coupled to said direct-current output of said power-factor corrector cell, a switch control input, and a direct-current output, providing a duty cycle modulator having an input coupled to said direct-current output of said direct-current-to-direct-current converter cell and an output coupled to both said switch control input of said power factor corrector cell and said switch control input of said direct-current-to-direct-current converter cell, operating both said power-factor corrector cell and said direct-current-to-direct-current converter cell in a discontinuous current mode for substantially said range of output currents furnished by said power-factor-corrected switching power supply.

* * * * *